May 28, 1968

J. F. DAVIS

3,384,986

PROGRESSIVELY ILLUMINATED SIGN

Filed July 25, 1966

INVENTOR
JAMES F. DAVIS
BY
EDWARD D. O'BRIAN
ATTORNEY

May 28, 1968 J. F. DAVIS 3,384,986
PROGRESSIVELY ILLUMINATED SIGN
Filed July 25, 1966 5 Sheets-Sheet 2

INVENTOR
JAMES F. DAVIS
BY EDWARD D. O'BRIAN
ATTORNEY

May 28, 1968

J. F. DAVIS 3,384,986

PROGRESSIVELY ILLUMINATED SIGN

Filed July 25, 1966

INVENTOR
JAMES F. DAVIS
BY
EDWARD D. O'BRIAN
ATTORNEY

May 28, 1968 J. F. DAVIS 3,384,986

PROGRESSIVELY ILLUMINATED SIGN

Filed July 25, 1966 5 Sheets-Sheet 5

INVENTOR
JAMES F. DAVIS
BY
EDWARD D. O'BRIAN
ATTORNEY

United States Patent Office 3,384,986
Patented May 28, 1968

3,384,986
PROGRESSIVELY ILLUMINATED SIGN
James F. Davis, 17154 Nordoff St.,
Northridge, Calif. 91324
Filed July 25, 1966, Ser. No. 572,640
11 Claims. (Cl. 40—130)

ABSTRACT OF THE DISCLOSURE

A plurality of superimposed light transmitting means are provided with removable letters and are illuminated by a source of light controlled by a movable belt type shutter so as to illuminate successive lines of said removable letters.

Background

Progressively illuminated signs are used as "spectaculars" for large outdoor displays. In some such signs the letters are created by selectively illuminating a plurality of lamps in a lamp bank; in others cam actuated switches progressively turn on individual letters made either of incandescent or fluorescent lighting components. These devices are too complex for small signs that can be used for point-of-purchase displays. The nature of the sign of this invention is such that it can accomplish the progressive illumination of the multi-lined message in a simple way and afford the user means of changing the message almost instantly with pre-printed plaques, and making his own messages with individual letter blocks quickly and without expense. Perhaps the most basic concept of the present invention is the proper control of light through use of conductive elements, baffles, shutters, letter blocks, or message plaques in such manner that progressive illumination occurs. The prior art does not teach such an integrated structure which incorporates the requisite control of the light to provide the desired progressive illumination together with bright and clear letter illumination.

Description

Accordingly, it is an object of this invention to provide a progressively illuminated sign which includes incorporation of proper control of light so as to provide progressive illumination of sign elements, which sign elements are thus brightly illuminated. It is another object of this invention to provide light conducting elements associated between the light source and the sign face, together with appropriate shutter means, so that progresive illumination occurs of the sign face. It is a further object of this invention to provide a progressively illuminated sign which includes at least one light source and a shutter which operates in conjunction with the light source, the shutter selectively providing illumination to light conducting structure, which in turn provides a light to the sign face so that progressive, bright illumination of the sign face is accomplished. It is a further object of this invention to provide a sign having elements in the form of sign line elements which occupy an entire sign line, or in one embodiment an entire sign panel, or sign elements which each carry an individual letter so that rearrangement of the sign message is easily accomplished, each sign message being brightly, progressively illuminated. It is another object of this invention to provide a progressively illuminated sign which employs a continuous belt shutter, a portion of the belt being transparent and another portion being opaque, the relative transparent and opaque portions determining the light which is transmitted to the sign face for progressive illumination thereof. It is still another object of this invention to provide a progressively illuminated sign which can be made relatively large or small so that it can be employed either as a display sign or in point of sale advertising and preferably which includes changeable sign elements so that the message of the sign can be readily changed for sales attraction. It is still another object of this invention to provide a sign which is economic, reliable, trouble-free and in which the sign elements can be readily changed so that a long, economic life of the sign is obtained. Other object and advantages of this invention will become apparent from a study of the following portion of this specification, the claims and the attached drawings.

Referring now particularly to FIGS. 1 through 5, a primary embodiment of the progressively illuminated sign of this invention is shown. Also in connection with this embodiment, FIGS. 6 through 8 show additional subsidiary embodiments of this particular embodiment. Thus, an embodiment of the progressively illuminated signal is generally indicated at 10. The sign 10 comprises a case or housing 12 which includes a front panel 14 in which sign opening 16 is formed. Sign opening 16 may be decoratively framed by frame 18 so that the exterior of the sign presents a pleasing, decorative appearance. Interiorly, the sign 10 comprises a light source 20, a light transmission control shutter in the form of belt 22, light conducting structure 24 and illuminated sign elements 26.

Figure 1:
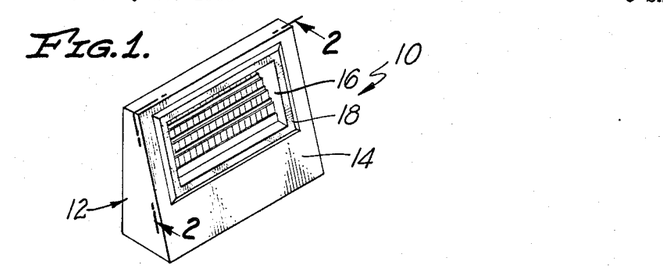
FIG. 1 is a front isometric view of a primary embodiment of the progressively illuminated sign of this invention.
Figure 2:
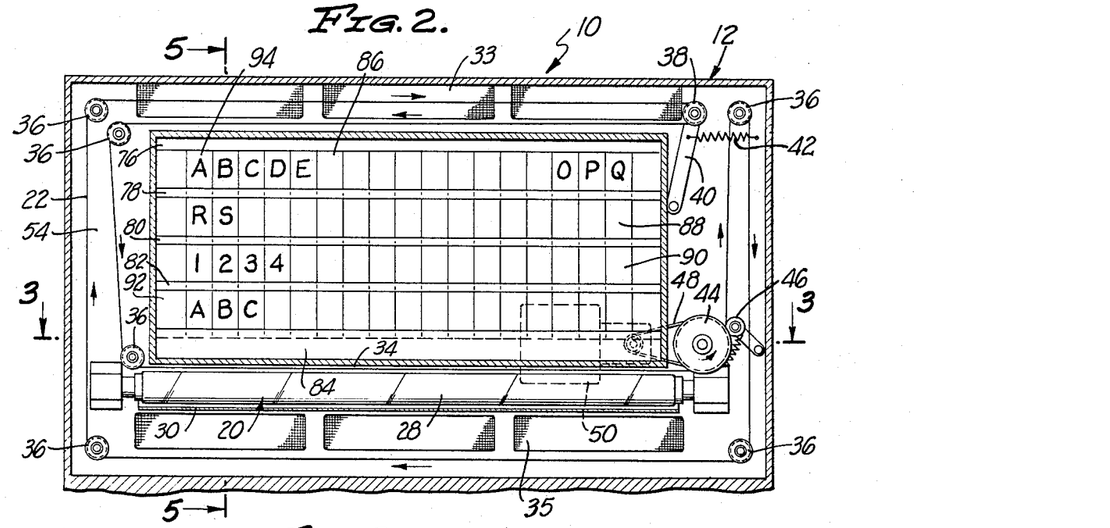
FIG. 2 is an enlarged section taken generally along the line 2—2 of FIG. 1.

Light source 20 is shown as being a fluorescent tube 28 backed by a suitable reflector 30 and supplied by ballast 32. A fluorescent tube is chosen as being a light source of adequate intensity, particularly when considering the intensity versus the heat emission thereof. Other light sources are possible, but most require a considerably greater amount of ventilation in order to maintain the structural contents of housing 12 at a reasonable temperature level. Ventilation is supplied to fluorescent tube 28 by means of screened openings 33 and 35 in the top and bottom of the back of housing 12. With fluorescent illumination, convective cooling is adequate. However, with incandescent illumination, forced cooling usually becomes necessary. For this reason, as well as the reason of the uniformity of illumination produced by a fluorescent tube, makes the fluorescent tube illumination means more desirable.

Figure 3:
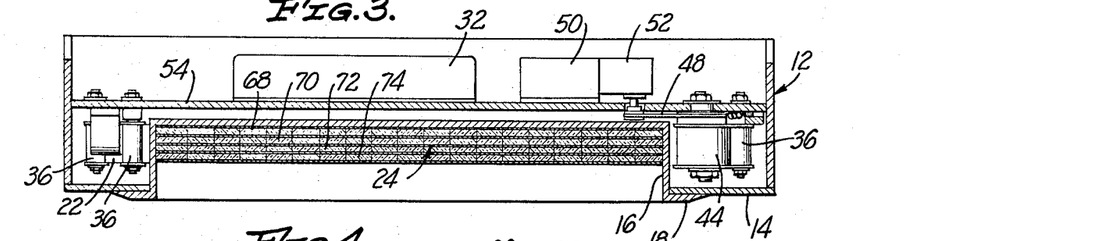
FIG. 3 is a section taken generally along the line 3—3 of FIG. 2.
Figures 5, 6, 7, 8:
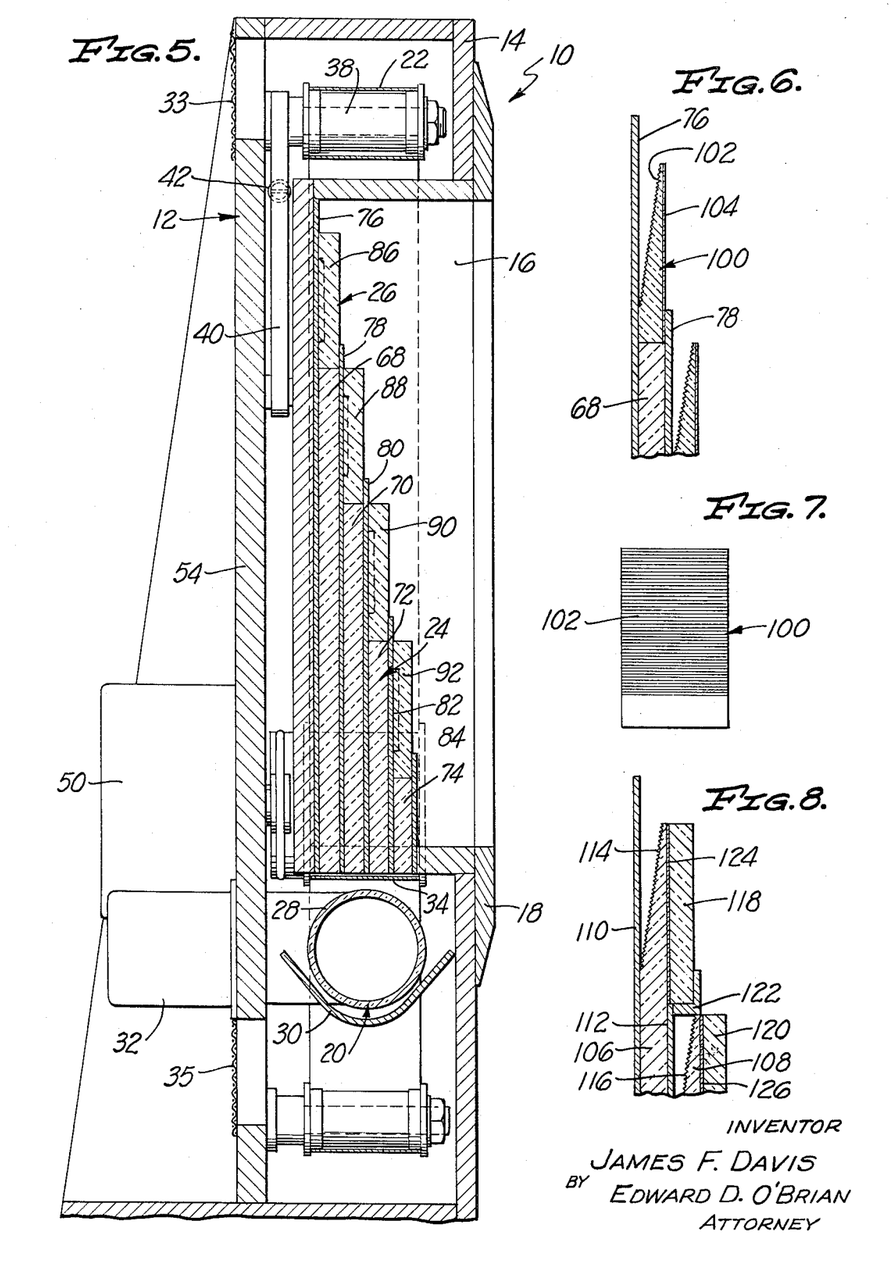
FIG. 5 is an enlarged section taken generally along the line 5—5 of FIG. 2.
FIG. 6 is a partial section similar to FIG. 5, showing alternative individual sign elements in an embodiment thereof.
FIG. 7 is a rear elevational view of one of the sign elements of FIG. 6.
FIG. 8 is a partial section, similar to the section of FIG. 5, showing another embodiment of a portion of the sign structure.

Fluorescent tube 28 is arranged horizontally adjacent the bottom of housing 12. Immediately above fluorescent tube 28 is positioned the active portion 34 of belt shutter 22. As is seen in FIG. 2, belt shutter 22 passes over a plurality of idler rolls 36, generally positioned in the corners of housing 12, and over spring loaded tension roller 38. Tension roller 38 is mounted upon arm 40 which is pivoted to housing 12, and is urged in a belt shutter tightening direction by means of spring 42. Belt shutter 22 also passes over drive roller 44 which has a surface thereon suitable for engagement with belt shutter 22 so as to propel it around its rollers. Press roll 46 is spring loaded against drive roller 44 so as to engage belt shutter 22 between. Press roll 46 enhances the friction drive of driver roller 44 upon belt 22. Drive roller 44 is driven by belt 48 at a suitable speed by motor 50 driving through reduction gear 52. As is seen in FIGS. 3 and 5, the rollers, motor and other structure are mounted upon back plate 54. It is optional to use a friction drive belt as described or a sprocket driven belt which uses standard perforated motion picture film as a belt.

Figure 4:
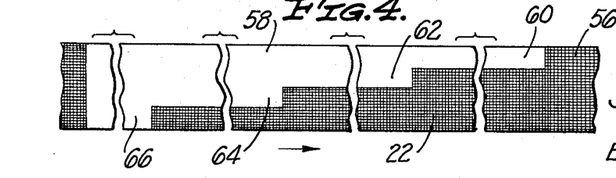
FIG. 4 is a top plan view, with parts broken away, of the belt shutter used in the progressively illuminated sign of FIG. 1.

As is seen in FIG. 4, which is a projected view of belt shutter 22 with parts broken away, the belt shutter has an opaque area 56 and a clear area 58. The opaque area and the clear area are generally considered with respect to the lengthwise direction of the belt. However, the belt is divided into four widthwise area, each corresponding to one-quarter width of the belt in the embodiment illustrated, and each corresponding to a horizontal line of sign elements 26 and to one row of the light conducting structure 24. The widthwise tracks are identified at 60, 62, 64 and 66. Each of these tracks control the illumination to one row of sign elements. When the belt shutter 22 travels from left to right in its traverse of the active portion 34, as is seen in FIGS. 2, 3 and 4, track 60 is the first to change from opaque to clear. Track 62 is the next to change from opaque to clear. The distance between the beginning of the clear portion of track 60 to the beginning of the clear portion of track 62 is preferably substantially equal to the overall horizontal length of one of the sign lines. Similarly, the distance from the beginning of the clear area in track 62 to the beginning of the clear area in track 64 and to the beginning of the clear area in track 66 are each substantially equal to the overall width of one of the signal lines. Furthermore, the length from the beginning of the clear area in track 66 to the end thereof, is approximately three times this width. Also, the beginning of the opaque area in all the tracks to the end of the opaque area in track 60 is preferably substantially equal to twice the width of the sign lines. As will become later apparent, each of these tracks controls the illumination of a sign line, and thus as the belt shutter 22 proceeds along its active course, the several lines are succesively progressively illuminated and then the signal remains totally illuminated. When the end of the clear area arrives in the active position, all lines are simultaneously progressively darkened and remain totally darkened for the length of time it takes to progressively illuminate one line.

It is clear that fluorescent tube 28 and reflector 30 provide illumination upwardly to the bottom of the active portion of belt shutter 22, and the shutter controls the passage of light to the position thereabove. Light conducting structure 24 comprises four rows of light conducting elements. These rows are indicated in FIGS. 3 and 5 at 68, 70, 72 and 74. As is best seen in FIG. 3, each of these rows is comprised of a plurality of elements. Each of the elements is preferably equal in width to a letter in the sign. These rows are arranged in back to front relationship and are positioned in line with the widthwise tracks 60 through 66. Thus, these rows of elements are selectively and progressively illuminated in accordance with opaque and clear areas of belt shutter 22. Each of the elements is preferably made of clear acrylic polymer composition material because of the high quality light conducting characteristics of that material. Vertical portions of each slat can be wrapped or coated with reflective material to reduce light loss and conduction to adjacent elements to thus improve step by step illumination. The rows are separated in front to back relationship by opaque material. Preferably the opaque material is also polymer composition material. Thus, light stops 76, 78, 80, 82 and 84 are positioned respectively behind, between and in front of the several rows. As is seen in FIG. 5, light stops 78 through 84 respectively extend slightly above the tops of rows of light conducting elements 68 through 74. This portion that extends above serves as a guide and support for individual letters which are positioned on the tops of the corresponding rows.

From the structure previously described, it is seen that the rows are each individually progressively illuminated. Individual letter blocks, each carrying a letter, are selectively placeable on the top edge of the light stops. A row of letter blocks is shown at 86 as being positioned on top of row of light conducting elements 68. It is seen that the row 86 is retained in position by the top edge of the light stop 78. Similarly, rows of letter blocks 88, 90, and 92 are positionable upon the tops of rows 70, 72, and 74 of the light conducting elements. Each of the letter blocks, one of which letter blocks is indicated at 94, and which is illustrated in more detail in FIG. 21, may be selected in accordance with the letters thereon and placed to convey the desired message. Each of the letter blocks is individually placeable so that any desired message, within the limits of the sign 10, can easily be spelled out.

Figures 18, 21, 22, 23:
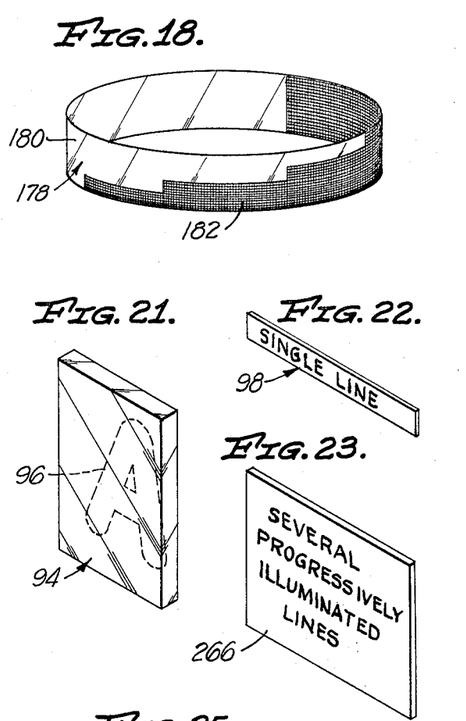
FIG. 18 is a single, wide belt shutter which is an alternative embodiment.
FIG. 21 is a front isometric view of a clear letter block having a letter engraved in the rear thereof, usable in the signs of FIGS. 1, 8 and 9.
FIG. 22 is an isometric view of a sign element having an entire single line of lettering thereon, usable in the embodiments of FIGS. 1, 8 and 9.
FIG. 23 is a front isometric view of a sign panel having the entire sign message thereon, usable in the embodiment of FIG. 11.

As is seen in FIG. 21, letter blocks 94, similar to all of the other letter blocks, comprises a rectangular piece of material. The material again is preferably acrylic polymer composition material for its light conducting properties. The desired letter, of which the letter A is illustrated at 96, is sand blasted or engraved into the back of the letter block 94. This is preferable to front engraving, both to produce smoothness on the front of the sign 10, and because rear engraving produces greater illumination and clarity. Due to the character of the material, light from tube 28 passes through belt 22, when the clear area 58 is so positioned, and light is conducted up the particular light conducting element in row 68 to the bottom of letter block 94. There it enters letter block 94 and is made visible to the front of the sign by impingement upon engraved letter 96. Thus, the letter 96 becomes illuminated while little random light escapes. The sides of block 94 can be coated with reflective material to prevent light leaks to adjacent letters. In this embodiment, the letter blocks are edge lighted.

An alternative construction for individual letter blocks is shown in FIGS. 6 and 7. The letter block of this embodiment is generally indicated at 100 and again comprises a letter block of such size as to carry an individual letter. The material again is preferably acrylic polymer composition material. However, instead of having the engraved letter produce the luminosity which produces the front visibility of the letter, the rear of the letter block is tapered and is scarified as at 102 so that light passing upward from the row of light conducting elements 68 into the letter block 100 to create luminosity by the scarified surface 102. The taper of the surface produces the maximum intensity of light viewed from the front. To provide a letter appearance, the front of letter block 100 is painted with opaque paint 104, to define the desired letter. The letter may be opaque or outlined opaque. Thus, when one sees the letter outlined by paint 104, and light is passing up into the letter block 100 from the bottom to edge light the block, one sees the luminosity of the illuminated surface 102. Thus, the letter is lighted. Of course, the structure of letter block 100 could very well be made of longer length so that a plurality of letters could be painted thereon, shown to the letter line 98, see FIG. 22. Such may be desirable for display of information which is somewhat more permanent, such as the store name or a name of one of the chief brands sold by a store. Of course, the single line 98 is of suitable width, thickness and height so as to be positionable over part of or the entire length of one of the rows of light conducting elements, similarly to part of or an entire row of letter blocks.

Figures 19, 20:
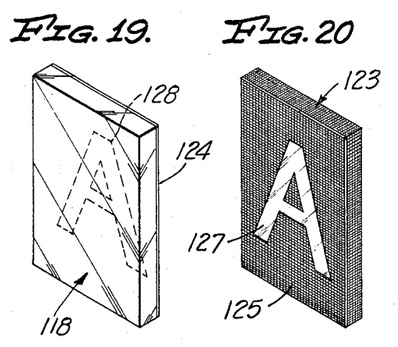
FIG. 19 is a front isomertic view showing a clear letter block having a letter outline with opaque areas on the rear thereof, usable in the signs of the embodiments of FIGS. 8 and 9.
FIG. 20 is a front isometric view of a single letter block showing a letter outlined with opaque areas on the front thereof, usable in the embodiments of FIGS. 8 and 9.

A further embodiment of this structure is illustrated in FIG. 8. In this case, rows of light conductors 106 and 108 extend upwardly from the belt shutter 22, similarly to rows 68 and 70. There are further rows of light conducting elements 106 and 108, so that four full rows are built up in the same manner as illustrated in FIG. 5. Furthermore, light stops 110 and 112 are provided, similarly to the manner described with respect to light stops 76 and 78. Again, light is conducted up the light conducting elements of rows 106 and 108, under the control of belt shutter 22, until it reaches the surfaces 114 and 116. There it is reflected forward and thus these surfaces appear luminescent from the front. Letter blocks 118 and 120 are positionable upon suitable letter block retainers such as retainers 122 secured to the top of light stop 112. By this means, the blocks are back lighted. Letter blocks 118 and 120 are preferably also of acrylic polymer composition material, but may be of any transparent material. Letter blocks 118 and 120 are preferably also of acrylic polymer composition material but it is obvious that even letter designs cut out of any opaque material would suffice in this application. The preferred form of letter blocks is indicated in more detail in FIGS. 19 and 20. With such back-lighting as surfaces 114 and 116 provide, it is optional to paint the letter designs on the front or back of such blocks. It is also optional to opaque the letter designs or opaque the background leaving the letter designs clear. Again, instead of individual letter blocks, entire lines of message can be provided as shown in FIG. 22. The letter blocks 118 and 120 are respectively painted with paint 124 and 126 in such manner that the paint outlines the letter which is to be illuminated. Thus, only the illuminated letters may be read. Again, instead of individual letter blocks 118 and 120, entire lines of messages can be provided in the manner described with respect to FIG. 21. Letter block 118 is illustrated in more detail in FIG. 19 wherein paint 124 is shown as outlining the letter A indicated at 128. As is illustrated in FIG. 20, letter block 123 carries opaque area 125 on the front thereof which creates letter 127. It can be seen that in any case the letter block is back lighted, the letter or the letter surrounding area can be opaque. Furthermore, in the case of a rear painted block, the block serves no optical function and a stencil cutout of opaque material can be substituted.

Figures 9, 10, 11, 12, 14:
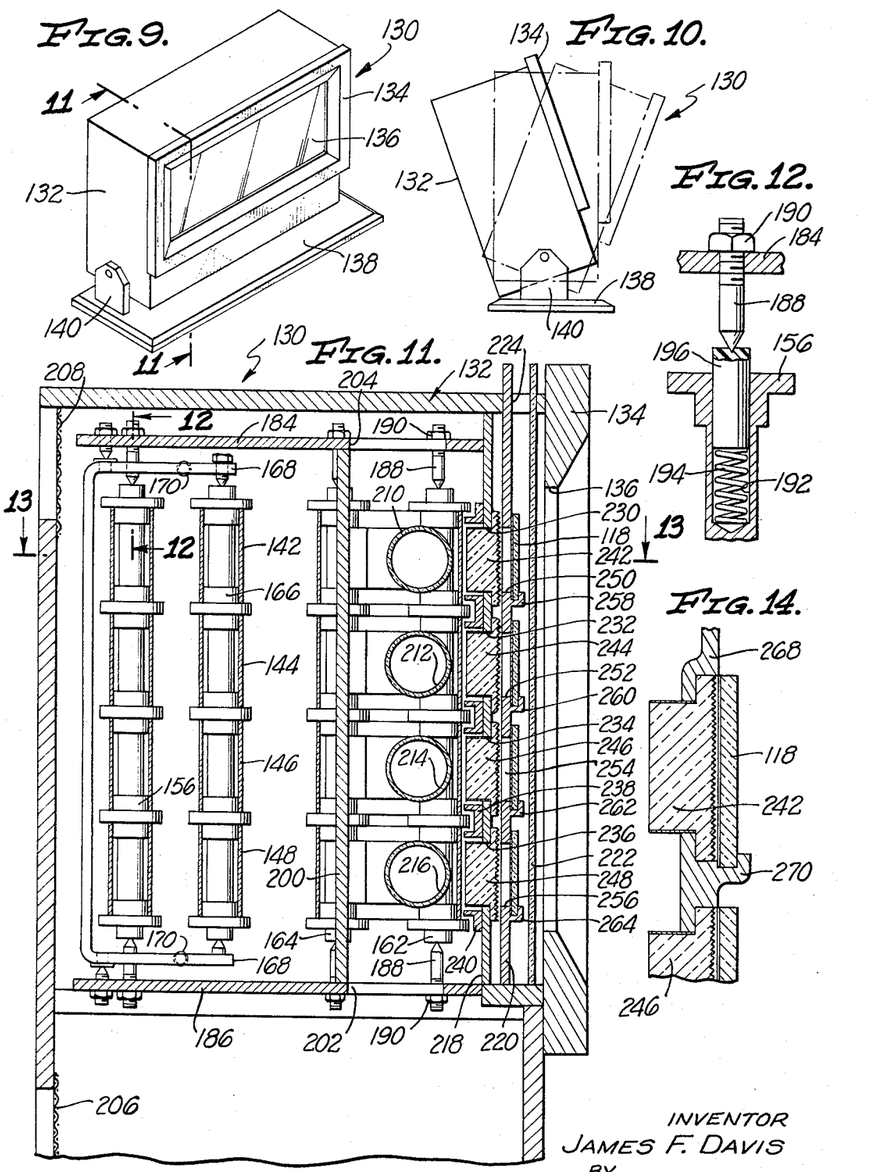
FIG. 9 is a front isometric view of a second primary embodiment and preferred embodiment of the progressively illuminated sign of this invention.
FIG. 10 is a left end elevational view thereof showing the positionability of the body of the sign of FIG. 9.
FIG. 11 is a partial enlarged section taken generally along the line 11—11 of FIG. 9.
FIG. 12 is an enlarged partial section taken generally along the line 12—12 of FIG. 11.
FIG. 14 is an enlarged partial vertical section of another embodiment of letter holding and adjacent structure usable in the sign of FIG. 11.

The preferred embodiment of the progressively illuminated sign of this invention is generally indicated at 130 and is shown in FIG. 9 through 14. First referring to FIGS. 9 and 10, the sign 130 has a housing 132 which is a substantially rectangular box having a frame 134 in the front and a sign opening 136 outlined by frame 134. Housing 132 carries the entire operative portion of the progressively illuminated sign. Base 138 has a pair of uprights, one of which is seen at 140. Housing 132 is pivoted on the uprights so that it may be positioned in the upright position illustrated in FIG. 9, and may be indexed to positions where it is directed upward, vertical or directed downward, as is seen in FIG. 10 in full and dashed lines, respectively. Thus, the sign 130 can be positioned either relatively low or relatively high, with respect to the viewer's line of sight, and can be directed in a proper direction for maximum legibility. Of course, this mounting is also feasible for the sign 10, for each of the signs are arranged so that the letter blocks will not fall out of position when they are tilted forward to a moderate degree.

Figures 13, 15, 16:
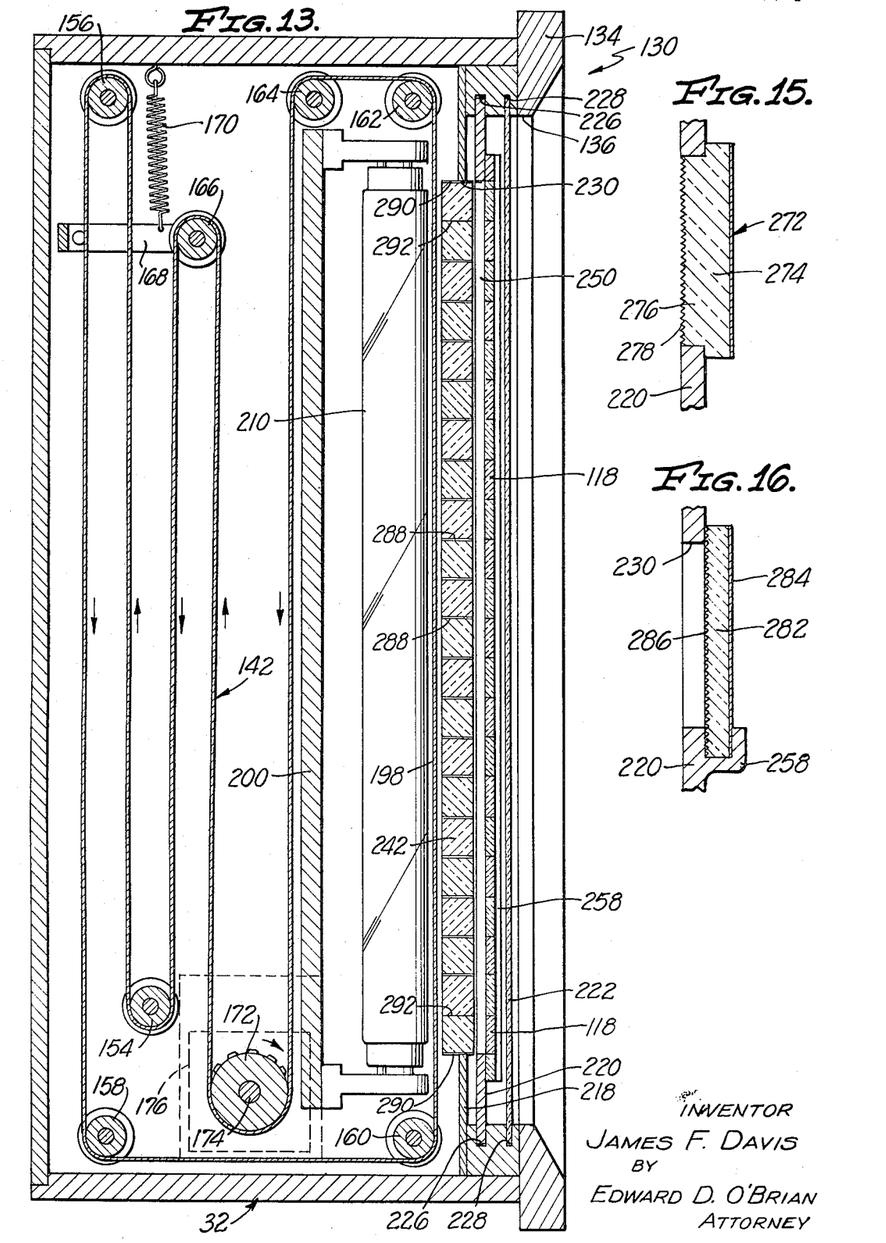
FIG. 13 is a horizontal section taken generally along the line 13—13 of FIG. 11.
FIG. 15 is similar to FIG. 14, showing another embodiment of letter holding and adjacent structure.
FIG 16 is similar to FIG. 14 showing still another embodiment of letter holding and adjacent structure.
Figure 17:
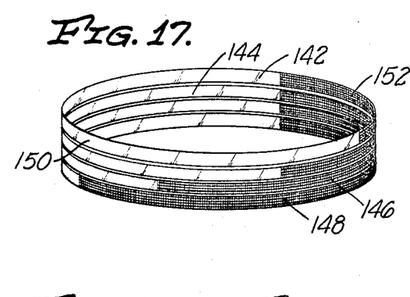
FIG. 17 is an isometric view showing a plurality of associated belt shutters as used in the progressively illuminated sign of FIG. 9.

Referring particularly to FIGS. 11 and 13, sign 130 contains belt shutters 142, 144, 146 and 148. As is seen in FIG. 17, each of the shutters has a clear area 150 and an opaque area 152. As is seen in FIG. 13, the belt shutters 142 through 148 are carried on a plurality of idler rollers 154, 156, 160, 162 and 164. Each of these idler rollers is arranged for the guidance of the four belt shutters, by means of appropriate guide flanges thereon. Additionally, takeup roller 166 is engaged by the several belt shutters. Takeup roller 166 is rotatably mounted upon arms 168 which are pivoted in housing 132. Springs 170 swing the arms 168 is such a direction as to properly tension the belt shutters. The several belt shutters also extend around drive sprocket 172. Since it is necessary that the several belts operate in continuous synchronization with each other, it is preferable that the belts have sprocket holes therein. There is a drive sprocket 172 for each of the belts, and these sprockets are all fixed to drive shaft 174. Thus, when the belt shutters are each properly arranged with respect to each other and engaged with the teeth on the drive sprocket, they remain in synchronization. Motor 176 drives shaft 174 in the correct direction and at the correct speed so as to propel the belt shutters along their paths. It is clear from this construction that several belt shutters are used because they can be handled in convenient widths. However, if desired, a single belt shutter 178, see FIG. 18, can be used in place of the belt shutters 140 through 148. In such a case, the idler rollers, the take up roller and the drive sprocket are suitably modified. In such a case, sprocket holes and sprocket teeth are not necessary but a simple friction drive surface upon drive sprocket 172 would suffice for synchronization of related belts is not necessary in such a case. The belt shutter 178 would have properly oriented clear area 180 and opaque area 182 for the purposes hereinafter described.

As is seen in FIGS. 11 and 12, the mounting structure which carries the belt drive and guidance structure comprises upper and lower frames 184 and 186, respectively. Corresponding pivot pins 188 are threaded into the upper and lower frames, and are locked in position by locknuts 190. The pivot pins 188 have pointed ends which engage in appropriate recesses. On the bottom ends of each roller, the recess is directly in the roller. The height of the roller is adjusted by the height of the lower pivot pins in frame 186. By this means alignment is obtained. Proper bearing loading is accomplished by providing socket 192 in the top ends of the roller. Spring 194 and plunger 196 are positioned in each socket 192. The plunger is a good sliding fit within the socket, and spring 194 urges the plunger out of the socket. An appropriate recess is provided in the top end of each plunger for engagement by the pointed nose on the associated upper pivot pin 188. Thus, spring 194 maintains proper loading forces which are independent of changes in structure size due to temperature or other variations. Thus, the various rollers rotate at minimum friction throughout the entire structure. It is seen that a similar structure can be provided for takeup roller 166.

It is apparent from the structure thus far described with respect to the sign 130 that there are four rows of reading matter within the sign and that there are four tracks on the belt shutters 148 and 178, for a particular track, is substantially equal to a line length. Furthermore, the totally clear area which progressively illuminates the last line and maintains the other lines illuminated is preferably three times the length of the single sign line. Thus, after the last line is fully illuminated, the entire sign remains illuminated for a time twice the time it takes to progressively illuminate a single line. The totally opaque area, wherein the entire sign is obscure, is preferably twice the length of a single sign line. Thus, as all four lines are at the same time progressively extinguished, such extinguishment takes the time equal to progress one line while the sign remains totally dark for an equal length of time. Of course, these various time ratios could be adjusted to suit different circumstances, particularly with respect to the totally illuminated and totally obscured times. However, it is considered desirable to begin the progressive illumination of the next line as soon as the previous line is totally illuminated. Thus, the distance from the beginning of the clear area with respect to one line to the beginning of the clear area with respect to the next line is preferably equal to a line length.

Referring again primarily to FIGS. 11 and 13, the active portion of the belt shutters extends substantially between idler rollers 160 and 162. In FIG. 13 the active portion of belt shutter 142 is indicated at 198. The active portion 198 is behind the sign opening 136. The lamp structure is positioned behind this active portion. Lamp support panel 200 is mounted between upper and lower frames 184 and 186. In addition to supporting the lamp, it serves as a circulating cooling air director. Openings 202 and 204, respectively, in frames 186 and 184, in association with ventilation openings 206 and 208 permit air convection past the lamps and past belt shutters to maintain them sufficiently cool. If desired, fan circulation driven by motor 176 can also be employed. Lamps 210, 212, 214, and 216 are mounted upon lamp support panel 200. Each of the lamps 210 through 216 is positioned respectively immediately behind one of the belt shutters 142 through 148. The lamps 210 are preferably high intensity fluorescent lamps of length substantially equal to the line length within the sign 130. Fluorescent lamps are considered desirable because of the relatively low heat output and the even surface illumination.

As has been seen in FIGS. 11 and 13, three plates extend upwardly from lower frame 186 in front of the active portion 198 of belt shutter 142. These plates are baffle plate 218, letter plate 220, and transparent cover plate 222. Slot 224 is positioned in the top above housing 132 so as to permit letter plate 220 and cover plate 222 to be inserted and removed. Guide slots 226 and 228 aid in the guidance and retention of the letter plate and cover plate 222 when they are inserted.

Baffle plate 218 is permanently installed in place. Baffle plate 218 has line slots 230, 232, 234, and 236 arranged horizontally therein. These line slots are positioned directly in front of lamps 210 through 216 respectively and directly in front of the active portions of belt shutters 142 through 148. Thus, the belt shutters control the light impinging at the line slots. Baffles 238 and 240 are positioned to prevent the escape of uncontrolled light from the desired direction. Similar baffles are positioned upon the back of the baffle plate 218 between the several slots and at the top and bottom thereof. If desired, a reflector can be positioned behind each lamp to increase the light intensity at the slots 230 to 236. Rows of individual light guides are positioned in the slots. The rows are indicated at 242, 244, 246, and 248. As is seen in FIG. 11, each of the light guides in these rows extends inwardly through their respective slots toward the lamps and terminate closely adjacent the active runs of the belt shutters. The face of each light guide towards the shutter is clear. In general, the sides of these light guides are reflective. The sides are naturally reflective when polished, but the reflectivity may be enhanced by wrapping them with reflective material. The front face of each of these light guides, in the embodiment shown in FIG. 11 is preferably striated. Thus, when the shutter is open to permit light to proceed from the lamp into the light guide, the front face becomes luminous. The striated front face is illustrated merely to show a manner in which conducted light may be diffused. Sand blasting of these front faces is also a practical means of accomplishing this purpose. Such light diffusion is preferable but not esential in the operation of this embodiment, for the faces of the fluorescent tubes provide luminous surfaces.

Letter plate 220 also has line slots therein. Line slots 250, 252, 254, and 256 extends across letter plate 220 in line with and parallel to slots 230 through 236 in baffle plate 218. Thus the front face of each of the rows of the light guides 242 through 248 is respectively visible through line slots 250 through 256.

Letter rails 258, 260, 262, and 264 are arranged on the front face of letter plate 220, respectively each just below line slots 250 through 256. The letter rails are adapted to carry individual letters which are placeable in such a position as to be progressively illuminated. In view of the fact that light is emitted through the line slots in letter plate 220, letters of the nature shown in FIGS. 19 and 20 and identified as letters 118 and 123 are suitable for use in such a location. These letters are again preferably of acrylic material and are painted on the front or back to outline the particular letter. These letters can be manually arranged along the letter rails so that the desired message is displayed. Furthermore, letter line 98, shown in FIG. 22, can be placed on the letter rails to display a message for which there is no need for ease of change. Also, in view of the fact the entire letter plate 220 can be removed, it is feasible to place in guide slots 226 sign plate 266, see FIG. 23, which carries a fixed message. Again, this message is preferably silk screened on the front or back of a transparent plate so as to outline the mesage, although such message could consist of stencil-form letters cut out of any opaque material. Transparent cover plate 222 slides into slots 228 so as to protect the face of the sign of letter plate 220. Such prevents undesired contact with the individual letters 118, provides an overall face to the sign to provide continuity and can be colored so as to provide the attractiveness of color. Thus, cover plate 222 is both protective and decorative. With the sign of this construction it is clear that individual letters can be placed in such desired sequence as to provide an easily changeable yet vitally illuminateable front which permits sales attractiveness.

Modifications of the individual letter structures are feasible in this construction. For example, in FIG. 14 a combined baffle plate and letter plate is indicated in 268. Plate 268 supports both the rows of light guides, such as rows 242 and 246 as well as provides letter rail 270 for the support of a row of letters 118. It is clear that letter rail 270 can accept an entire single line 98, or the combined baffle and letter plate 268 can be removed out of its support slots so that the sign 132 will accept an entire sign plate 266, similar to the earlier structure.

In the embodiments of FIGS. 15 and 16, the letter plate 220 is again shown, including letter rail 258. In the embodiment of FIG. 15, however, a unitary letter-light guide structure 272 is shown. A plurality of individual letters 274 are provided and these are painted on the front similarly to letter 128, FIG. 20 so as to outline a particular letter. Secured to the back of or integral with letter 274 is light guide 276. The rear of the light guide, the side facing the lamps, can be striated at 278. Both the letter 274 and light guide 276 are preferably of acrylic material for the light conducting properties thereof. Thus, when light impinges upon the back of light guide 276, it is conducted forward to illuminate the letter outlined on letter blocks 274. Slot 280 in letter plate 220 permits the combined letter-light guide 272 to be inserted and removed, thus eliminating the need of letter racks. In FIG. 16, the rear of slot 230 faces the light source and letter block 282 is insertable in letter rail 258. The rear of letter block 282 can preferably be striated at 286 so that light reaching the rear face from the lamps and through the transparent part of the belt shutter is scattered into the interior of letter block 282. Since the letter block is again of transparent material, preferably of light piping characteristics, the outlined letter represented by the outline of paint 284 is illuminated. Without the striations on the rear of block 282, the light from the source is directly conducted through block 82 to the sign face.

All of the letter block, letter line, and sign panel structures usable with the preferred embodiment of FIG. 9 are back lighted, as contrasted to the edge lighting of FIGS. 5 and 6. Thus, instead of transparent panels carrying opaque areas to define letters, opaque panels with cut out letter defining areas can be used. A metal plate of suitable dimensions with a cut out letter is satisfactory.

Returning now to FIG. 13, the row of light guides 242 is illustrated therein. These light guides lie next to each other, and preferably correspond to and are aligned with the letters 118 on letter rail 258. Thus, as each of the individual light guides in the rear 242 is illuminated, the corresponding letter in front of each of the light guides is illuminated. Alignment need not be exact, but it is preferable to maintain as much separation of light from transferring from one to the next adjacent light guide in order to make sharp progression of illumination of the letter blocks. This is accomplished by placing reflective material on the facing sides of the light guides. Thus, reflective material is placed at 288, between adjacent letter blocks and at ends 290. However, in view of the fact that illumination is slightly weaker at the ends of the row of light guides, reflective material is omitted between the two light guides at each end of each row. Thus, reflective material is omitted at faces 292.

Figure 24:
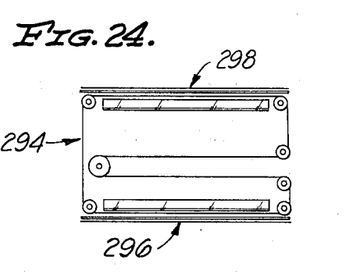
FIG. 24 is a schematic top plan view showing the arrangement of the sign of FIG. 9 arranged for double face viewing.
Figure 25:
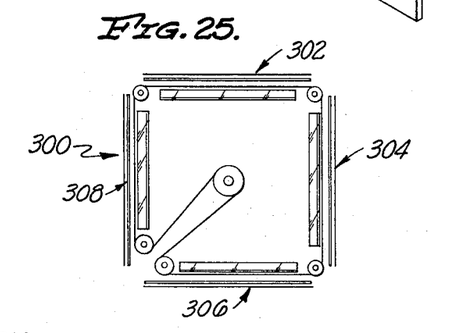
FIG. 25 is a schematic top plan view showing the sign of the embodiment of FIG. 9 arranged for viewing from four sides.
Figure 26:
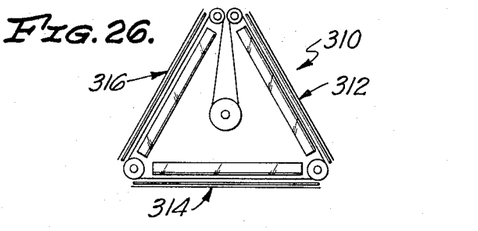
FIG. 26 is a top plan schematic view of the sign of FIG. 9 arranged for viewing from three sides.

In view of the fact that the belt shutters 142 through 148 progress idly through the interior of sign 132, when they are not in the active traverse 198, it is clear that they can be used for controlling the progressive illumination of other sign faces, in addition to the single face of sign 132. In FIGS. 23, 24, and 25 multiple illuminated faces are indicated by schematics of the top plan of such signs. Sign 294 of FIG. 23 is identical to sign 130, except for the fact that it has two active sign faces 296 and 298. Each of these faces is identical to the single progressively illuminated sign face of sign 130. Each includes lamps, an active portion of the belt shutter and selectively positionable letters or the like. Similarly, sign 300 of FIG. 24 has faces 302, 304, 306, and 308. Again, each corresponds to the single active face of sign 130. In addition, sign 310 of FIG. 25 has faces 312, 314, and 316. Each of these faces is like the single face of sign 130. By these means, the same or different information can be shown in different directions in accordance with the merchandising need, while only a single operating structure and single housing is needed to display this information in different directions for different viewing.

Ths invention havng been described in its preferred embodiment, it is clear that it is susceptible to numerous modifications and embodiments within the skill of the routine artisan and without the exercise of the inventive faculty. Accordingly, the scope of this invention is defined by the scope of the following claims.

I claim:

1. A progressively illuminated sign, said progressively illuminated sign comprising a light source, light ducting structure, belt shutter mans postioned between said light source and said light ducting structure and illuminatable letter means positioned so as to be selectively illuminated by said light ducting structure;

said belt shutter means being transportably mounted within said sign, said belt shutter means having transparent and opaque areas therein, said light source, said belt shutter means, and said light ducting structure being relative positioned so that when an opaque area of said belt shutter means is positioned between said light source and said light ducting structure, said light ducting structure is unilluminated, while when a transparent portion of said belt shutter means is positioned between said light source and said light ducting structure, said light ducting structure is illuminated and said letter means is illuminated.

2. The progressively illuminated sign of claim 1 wherein said belt shutter means is substantially linearly movable between said light source and said light ducting structure.

3. The progressively illuminated sign of claim 2 wherein there are a plurality of individual light ducting structures arranged transversely to the direction of movement of said belt shutter means, each of the plurality of light ducting structures arranged transversely to the direction of movement being separated so that illumination of one of said light ducting structures does not illuminate an adjacent light ducting structure.

4. The progressively illuminated sign of claim 3 wherein there are a plurality of tracks on said belt shutter means, each of said tracks being arranged to control illumination to one of said rows of light ducting structure so that one of said rows can be illuminated while an adjacent row remains unilluminated.

5. The progressively illuminated sign of claim 4 wherein individual letter blocks are positionable adjacent said light ducting structure so that when said light ducting structure is illuminated, adjacent letter blocks are illuminated, there being a row of letter blocks for each row of light ducting structure.

6. The progressively illuminated sign of claim 5 wherein each row of light ducting structure is made up of the plurality of individual light ducts, each of said light ducts being substantially equal to the width of one of said letter blocks so that individual letters are illuminated when individual light ducts are illuminated.

7. The progressively illuminated sign of claim 3 wherein an engraved letter block is associated with said light ducting structure, said engraved letter block being arranged so that illumination of said light ducting structure causes illumination of the engraved letter in said letter block.

8. The progressively illuminated sign of claim 3 wherein light scattering means is associated with said light ducting structure, said light scattering means being illuminated when said light ducting structure is illuminated, a latter block having transparent and opaque areas positioned adjacent said light scattering means so that when said light scattering means is illuminated, said transparent area of said letter block is illuminated.

9. The progressively illuminated sign of claim 3 wherein there is a single illumination means for each row of light ducting structure transverse to the direction of best movement, and wherein said illumination means is positioned closely adjacent said letter means.

10. The progressively illuminated sign of claim 3 wherein the plurality of rows of light ducting structure arrange transversely to the direction of belt shutter motion are of different lengths so that letter blocks positioned in association with said rows of light ducting structure are arranged in separated rows.

11. A progressively illuminated sign, said progressively illuminated sign comprising a light source, letter means positioned so as to be illuminated by said light source and belt shutter means interposed between said light source and said letter means so as to control illumination of said letter means;

said letter means comprising a plurality of rows of letters adapted to be progressively illuminated;

said belt shutter being movably mounted within said sign in a direction generally parallel to said rows of letters, a plurality of tracks on said belt shutter, each of said tracks corresponding to a row of letters, said belt shutter having transparent and opaque areas, said transparent and opaque areas being arranged to control the impingement of light from said light source to said letter means and being arranged so that the individual rows of the shutters are progressively illuminated upon progressive illumination of the rows of letters by motion of said belt shutter means.

References Cited
UNITED STATES PATENTS

| | | |
|---|---|---|
| 2,196,105 | 4/1940 | Cunningham. |
| 2,480,178 | 8/1949 | Zinberg. |
| 2,639,528 | 5/1953 | Ochsner. |
| 2,722,762 | 11/1955 | Krajian. |
| 3,184,872 | 5/1965 | Way ______________ 40—106.53 |

EUGENE R. CAPOZIO, *Primary Examiner.*

W. J. CONTRERAS, *Examiner.*

UNITED STATES PATENT OFFICE
CERTIFICATE OF CORRECTION

Patent No. 3,384,986                      May 28, 1968

James F. Davis

It is certified that error appears in the above identified patent and that said Letters Patent are hereby corrected as shown below:

Column 3, line 65, "area" should read -- areas --. Column 4, line 8, "signal" should read -- sign --. Column 7, line 11, "183" should read -- 188 --. Column 9, line 59, "single face" should read -- single sign face --. Column 10, line 12, "mans" should read -- means --.

Signed and sealed this 14th day of October 1969.

(SEAL)
Attest:

Edward M. Fletcher, Jr.                      WILLIAM E. SCHUYLER, JR.

Attesting Officer                           Commissioner of Patents

PO-1050
(5/69)

UNITED STATES PATENT OFFICE
CERTIFICATE OF CORRECTION

Patent No. 3,384,986          Dated May 28, 1968

Inventor(s) James F. Davis

It is certified that error appears in the above-identified patent and that said Letters Patent are hereby corrected as shown below:

Column 12, line 5, "shutters" should be --letters--

Column 12, lines 6 and 7, cancel --upon progressive illumination of the rows of letters--

Signed and sealed this 6th day of February 1973.

(SEAL)
Attest:

EDWARD M. FLETCHER, JR.
Attesting Officer

ROBERT GOTTSCHALK
Commissioner of Patent